US012617383B2

(12) United States Patent
Jo

(10) Patent No.: US 12,617,383 B2
(45) Date of Patent: May 5, 2026

(54) ELECTROMECHANICAL BRAKE SYSTEM AND METHOD OF OPERATING THE SAME

(71) Applicant: HL MANDO CORPORATION, Gyeonggi-do (KR)

(72) Inventor: Taeho Jo, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 484 days.

(21) Appl. No.: 18/098,109

(22) Filed: Jan. 18, 2023

(65) Prior Publication Data

US 2023/0227018 A1      Jul. 20, 2023

(30) Foreign Application Priority Data

Jan. 18, 2022      (KR) ......................... 10-2022-0007239

(51) Int. Cl.
  *B60T 13/74*      (2006.01)
  *B60T 17/22*      (2006.01)
(52) U.S. Cl.
  CPC ............ *B60T 13/741* (2013.01); *B60T 17/22* (2013.01)
(58) Field of Classification Search
  CPC ...... B60T 13/741; B60T 13/662; B60T 17/22; B60T 7/042
  See application file for complete search history.

(56) References Cited

U.S. PATENT DOCUMENTS

| | | | | |
|---|---|---|---|---|
| 10,358,119 | B2 * | 7/2019 | Besier | B60T 13/142 |
| 12,005,870 | B2 * | 6/2024 | Leiber | B60T 7/042 |
| 12,179,721 | B2 * | 12/2024 | Seol | H02P 6/24 |
| 2017/0282877 | A1 | 10/2017 | Besier et al. | |
| 2019/0210581 | A1 * | 7/2019 | Saito | B60T 13/686 |
| 2021/0122349 | A1 * | 4/2021 | Leiber | B60T 13/662 |

FOREIGN PATENT DOCUMENTS

| | | | |
|---|---|---|---|
| JP | 2001-39279 | | 2/2001 |
| KR | 20120048877 | A * | 5/2012 |
| KR | 20160114943 | A * | 10/2016 |
| KR | 10-2019-0063258 | | 6/2019 |

(Continued)

OTHER PUBLICATIONS

Office Action (1st) dated Aug. 27, 2025 for Korean Patent Application No. 10-2022-0007239 and its English translation provided by Applicant's foreign counsel.

*Primary Examiner* — Vishal R Sahni
(74) *Attorney, Agent, or Firm* — WOMBLE BOND DICKINSON (US) LLP

(57)      ABSTRACT

The present disclosure relates to an electromechanical brake system and a method of operating the same, and the electromechanical brake system includes a motor that operates for braking of a vehicle, a first electronic controller electrically connected to the motor and configured to control driving of the motor, and a second electronic controller electrically connected to the motor and configured to control the driving of the motor, wherein the first electronic controller may calculate a current command value using a pressure command for the braking and outputs a pulse width modulation (PWM) duty using the calculated current command value, and the second electronic controller may output the PWM duty using the current command value calculated by the first electronic controller.

18 Claims, 4 Drawing Sheets

(56)          References Cited

FOREIGN PATENT DOCUMENTS

| | | | | |
|----|----|----|----|----|
| KR | 10-2020-0140752 | | 12/2020 | |
| KR | 20200140752 A | * | 12/2020 | |
| KR | 20220096438 A | * | 7/2022 | |
| WO | WO-2019065984 A1 | * | 4/2019 | .............. B60T 13/14 |
| WO | WO-2021037664 A1 | * | 3/2021 | ................ B60L 7/10 |

* cited by examiner

1

ELECTROMECHANICAL BRAKE SYSTEM AND METHOD OF OPERATING THE SAME

CROSS-REFERENCE TO RELATED APPLICATION

This application is based on and claims priority under 35 U.S.C. § 119 to Korean Patent Application No. 10-2022-0007239, filed on Jan. 18, 2022 in the Korean Intellectual Property Office, the disclosure of which is incorporated herein by reference.

BACKGROUND

1. Field

Embodiments of the present disclosure relate to an electromechanical brake system and a method of operating the same, and more specifically, to an electromechanical brake system and a method of operating the same, which may efficiently control a brake in a normal state.

2. Description of the Related Art

A vehicle necessarily includes a brake system for braking. Recently, such a brake system electronically controls a braking hydraulic pressure transmitted toward a wheel cylinder mounted on a wheel in order to obtain a stronger and more stable braking force.

The conventional brake systems use a method of supplying a hydraulic pressure required for braking to a wheel cylinder using a mechanically connected booster when a driver steps on a brake pedal. However, as the demand for effectively implementing a braking function in various environments by minutely responding to the operating environment of a vehicle increases, an electromechanical brake system is used. The electromechanical brake system uses a hydraulic supply device for converting the driver's braking intention into a signal using a pedal displacement sensor for detecting the displacement of a brake pedal when the driver steps on the brake pedal and supplying a hydraulic pressure required for braking to a wheel cylinder according to the signal.

Such an electromechanical brake system is controlled by a signal output from an electronic controller, and when a problem occurs in the electronic controller and main components are not operated, a hydraulic pressure required for braking is not stably formed.

SUMMARY

Therefore, it is an aspect of the present disclosure to provide an electromechanical brake system and a method of operating the same, which may generate a braking pressure according to a driver's intention when both of two electronic controllers are in a normal state in the electromechanical brake system.

Additional aspects of the disclosure will be set forth in part in the description which follows and, in part, will be obvious from the description, or may be learned by practice of the disclosure.

In accordance with one aspect of the present disclosure, an electromechanical brake system includes a motor configured to operate for braking of a vehicle, a first electronic controller electrically connected to the motor and configured to control driving of the motor, and a second electronic controller electrically connected to the motor and configured to control the driving of the motor. The first electronic controller may be configured to calculate a current command value using a pressure command for the braking and output a pulse width modulation (PWM) duty using the calculated current command value. The second electronic controller may be configured to output the PWM duty using the current command value calculated by the first electronic controller.

The first electronic controller may be configured to output the PWM duty using a certain percentage of the calculated current command value. The second electronic controller may be configured to output the PWM duty using the remaining percentage of the current command value calculated by the first electronic controller.

The first electronic controller may include a pressure controller configured to calculate a torque value of the motor for braking using the pressure command, a speed controller configured to calculate a current command value for controlling a speed of the motor, and a first current controller configured to calculate the PWM duty using a certain percentage of the current command value calculated by the speed controller.

The second electronic controller may include a second current controller configured to calculate the PWM duty using the remaining percentage of the current command value calculated by the speed controller.

The first electronic controller may be configured to receive the PWM duty calculated by the first current controller and output the PWM duty after converting power to be applied to the motor.

The first current controller may be configured to calculate the PWM duty using half of the calculated current command value. The second current controller may be configured to calculate the PWM duty using half of the calculated current command value.

The first current controller and the second current controller may be configured to calculate the PWM duty using the same current command value.

The first electronic controller may be configured to output the PWM duty using the calculated current command value. The second electronic controller may be configured to receive and output the PWM duty calculated by the first electronic controller.

The first electronic controller may include a pressure controller configured to calculate a torque value of the motor for braking using the pressure command, a speed controller configured to calculate a current command value for controlling a speed of the motor, a first current controller configured to calculate the PWM duty using the current command value calculated by the speed controller, and a first power converter configured to output the PWM duty calculated by the first current controller.

The second electronic controller may include a second power converter configured to receive and output the PWM duty calculated by the first current controller.

The motor may include a three-phase permanent magnet synchronous motor.

Both of the first electronic controller and the second electronic controller may be in a normal state.

Meanwhile, in accordance with another aspect of the present disclosure, a method of operating an electromechanical brake system includes inputting a pressure command to a first electronic controller so that a motor operates for braking of a vehicle, calculating, by the first electronic controller, a torque value of the motor according to the input pressure command, calculating, by the first electronic controller, a current command value for outputting a total torque of the motor, outputting, by the first electronic controller, a PWM duty using the calculated current command value, and outputting, by a second electronic controller, the PWM duty using the current command value calculated by the first electronic controller.

The outputting of the PWM duty by the first electronic controller may include outputting the PWM duty after calculated using a certain percentage of the calculated current command value.

The method may further include calculating, by the second electronic controller, the PWM duty using the remaining percentage of the calculated current command value. The outputting of the PWM duty by the second electronic controller comprises outputting the PWM duty calculated by the second electronic controller.

The PWM duty may be calculated, by the first electronic controller and the second electronic controller using the same current command value.

The PWM duty may be calculated, by the first electronic controller, using half of the calculated current command value. The PWM duty is calculated, by the second electronic controller, using half of the calculated current command value.

The outputting of the PWM duty by the second electronic controller may include outputting the PWM duty calculated by the first electronic controller.

The method may further include transmitting the PWM duty calculated by the first electronic controller to the second electronic controller. The outputting of the PWM duty by the second electronic controller may include outputting the PWM duty transmitted from the first electronic controller.

Both of the first electronic controller and the second electronic controller may be in a normal state.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
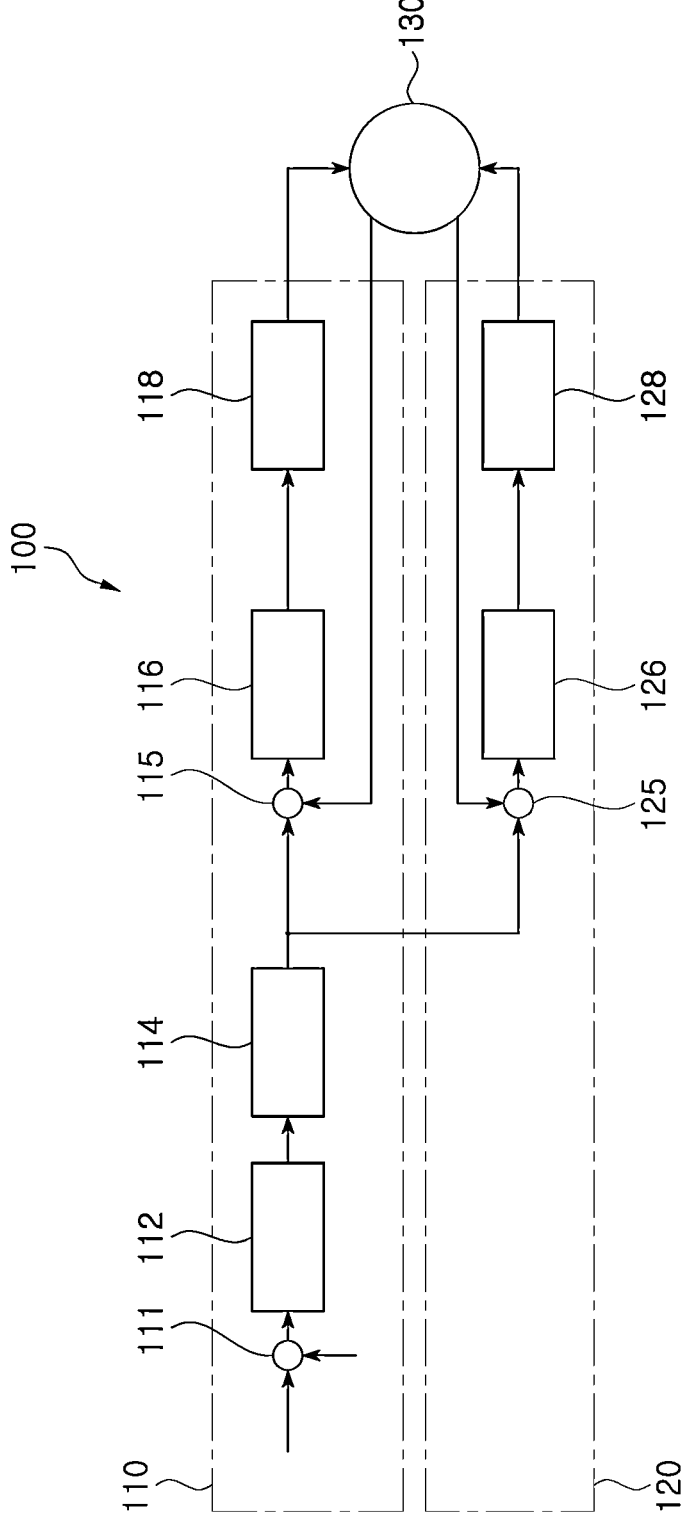
FIG. 1 is a block diagram showing an electromechanical brake system according to a first embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Referring to FIG. 1, an electromechanical brake system 100 according to a first embodiment of the present disclosure will be described. The electromechanical brake system 100 according to the first embodiment of the present disclosure includes a first electronic controller 110, a second electronic controller 120, and a motor 130.

The first electronic controller 110 controls a torque of the motor 130 to generate a braking pressure according to a driver's braking intention and is electrically connected to the motor 130. The first electronic controller 110 includes a first merger 111, a pressure controller 112, a speed controller 114, a second merger 115, a first current controller 116, and a first power converter 118.

A pressure command and a measured pressure are input to the first merger 111. The pressure command and the measured pressure input through the first merger 111 are output to the pressure controller 112. The pressure command is a pressure value for setting and commanding a pressure required for operating a brake, and the measured pressure is a pressure obtained by measuring a hydraulic pressure used for operating the brake.

The pressure controller 112 receives the pressure command and the measured pressure from the first merger 111, controls the hydraulic pressure required for operating the brake using the received pressure command and measured pressure, and calculates a torque value of the motor 130.

The speed controller 114 calculates a current command value for outputting a total torque to control a speed of the motor 130. The speed controller 114 outputs a certain percentage of the calculated current command value to the first current controller 116 and outputs the remaining percentage of the calculated current command value to the second electronic controller 120. For example, the speed controller 114 outputs half of the calculated current command value to the first current controller 116 and outputs the remaining half to the second electronic controller 120.

The second merger 115 receives a certain percentage of the calculated current command value output from the speed controller 114 and also receives a measured current value from the motor 130. The second merger 115 transmits a certain percentage of the current command value calculated by the speed controller 114 and the measured current value from the motor 130 to the first current controller 116.

The first current controller 116 calculates a pulse width modulation (PWM) duty using a certain percentage of the current command value calculated by the second merger 115 and the measured current value and outputs the calculated PWM duty.

The first power converter 118 receives the PWM duty calculated by the first current controller 116 and outputs the PWM duty after converting power to be applied to the motor 130.

The second electronic controller 120 controls the torque of the motor 130 to generate a braking pressure according to the driver's braking intention and is electrically connected to the motor 130. The second electronic controller 120 includes a third merger 125, a second current controller 126, and a second power converter 128.

The third merger 125 receives the remaining percentage of the calculated current command value output from the speed controller 114 of the first electronic controller 110 and also receives the measured current value from the motor 130. For example, the speed controller 114 outputs half of the calculated current command value to the second merger 115 and outputs the remaining half to the third merger 125 of the second electronic controller 120. The second merger 115 transmits a certain percentage of the current command value calculated by the speed controller 114 and the measured current value from the motor 130 to the second current controller 126.

The second current controller 126 calculates a PWM duty using a certain percentage of the current command value calculated by the third merger 125 and the measured current value and outputs the calculated PWM duty.

The second power converter 128 receives the PWM duty calculated by the second current controller 126 and outputs the PWM duty after converting power to be applied to the motor 130.

The motor 130 may receive the PWM duty through each of the first power converter 118 and the second power converter 128 and may be driven by the received PWM duty. The motor 130 may be a three-phase synchronous motor 130 using a permanent magnet and configured in a double winding method.

Figure 2:
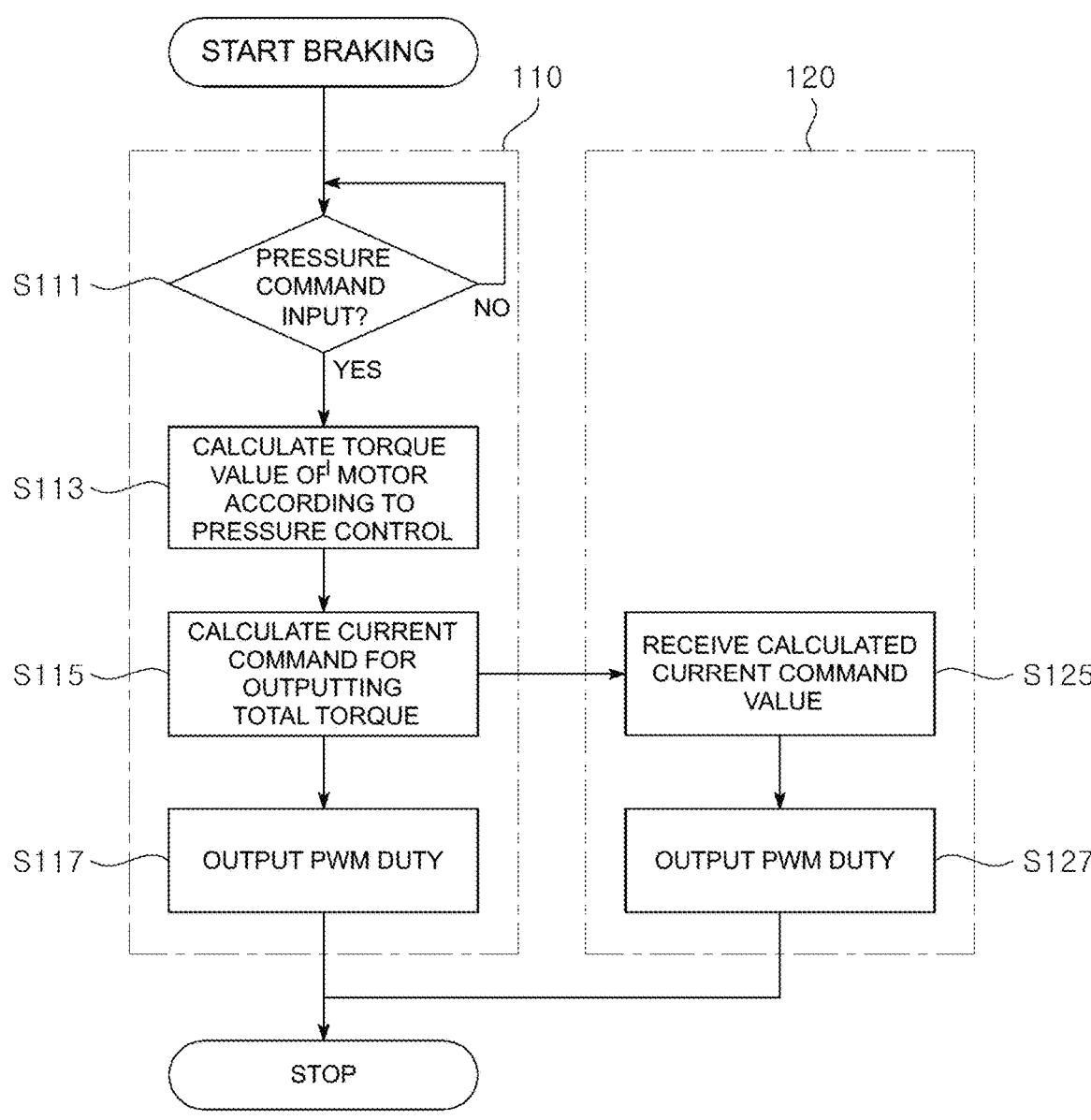
FIG. 2 is a flowchart showing a method of operating the electromechanical brake system according to the first embodiment of the present disclosure.

Referring to FIG. 2, a method of operating the electromechanical brake system 100 according to the first embodiment of the present disclosure will be described. The method of operating the electromechanical brake system 100 according to the first embodiment of the present disclosure will be described with reference to FIG. 1.

When braking starts in the electromechanical brake system 100, whether a pressure command is input is checked (S111).

Whether the pressure command is input to the pressure controller 112 of the first electronic controller 110 through the first merger 111 is checked, and it is determined that the pressure command is not input to the pressure controller 112, the electromechanical brake system 100 waits until the pressure command is input, and whether the pressure command is input to the pressure controller 112 is continuously checked.

When the pressure command is input, the torque value of the motor 130 according to pressure control is calculated (S113).

The pressure controller 112 of the first electronic controller 110 controls a hydraulic pressure required for operating the brake using the input pressure command and the measured pressure and calculates a torque value of the motor 130. Here, the pressure command is a pressure value for setting and commanding a pressure required for operating the brake, and the measured pressure is a pressure obtained by measuring the hydraulic pressure used for operating the brake.

When the torque value of the motor 130 is calculated, a current command for outputting the total torque is calculated (S115).

In order to control a speed of the motor 130, a current command value for outputting the total torque is calculated by the speed controller 114 of the first electronic controller 110. The speed controller 114 outputs a certain percentage of the calculated current command value to the first current controller 116 and outputs the remaining percentage of the calculated current command value to the second electronic controller 120.

A PWM duty is output (S117).

A PWM duty is calculated by the first current controller 116 of the first electronic controller 110 using a certain percentage of the current command value calculated by the speed controller 114 and the measured current value from the motor 130. The first power converter 118 of the first electronic controller 110 converts power into a PWM duty using the PWM duty calculated by the first current controller 116 and outputs the PWM duty.

The remaining percentage of the calculated current command value is received (S125).

The second current controller 126 of the second electronic controller 120 receives the remaining percentage of the current command value calculated by the speed controller 114 of the first electronic controller 110. For example, the speed controller 114 outputs half of the calculated current command value to the second merger 115 and outputs the remaining half to the third merger 125 of the second electronic controller 120. The second merger 115 transmits a certain percentage of the current command value calculated by the speed controller 114 and the measured current value from the motor 130 to the second current controller 126.

A PWM duty is output (S127).

A PWM duty is calculated by the second current controller 126 of the second electronic controller 120 using a certain percentage of the current command value calculated by the speed controller 114 and the measured current value from the motor 130. The second power converter 128 of the second electronic controller 120 converts power into a PWM duty using the PWM duty calculated by the second current controller 126 and outputs the PWM duty.

As described above, the PWM duty output in each of the operations S117 and S127 may be transmitted to the motor 130, and the motor 130 may be driven using the transmitted PWM duty so that the brake system may be operated. After the brake system is operated as described above, the brake system may be stopped.

Figure 3:
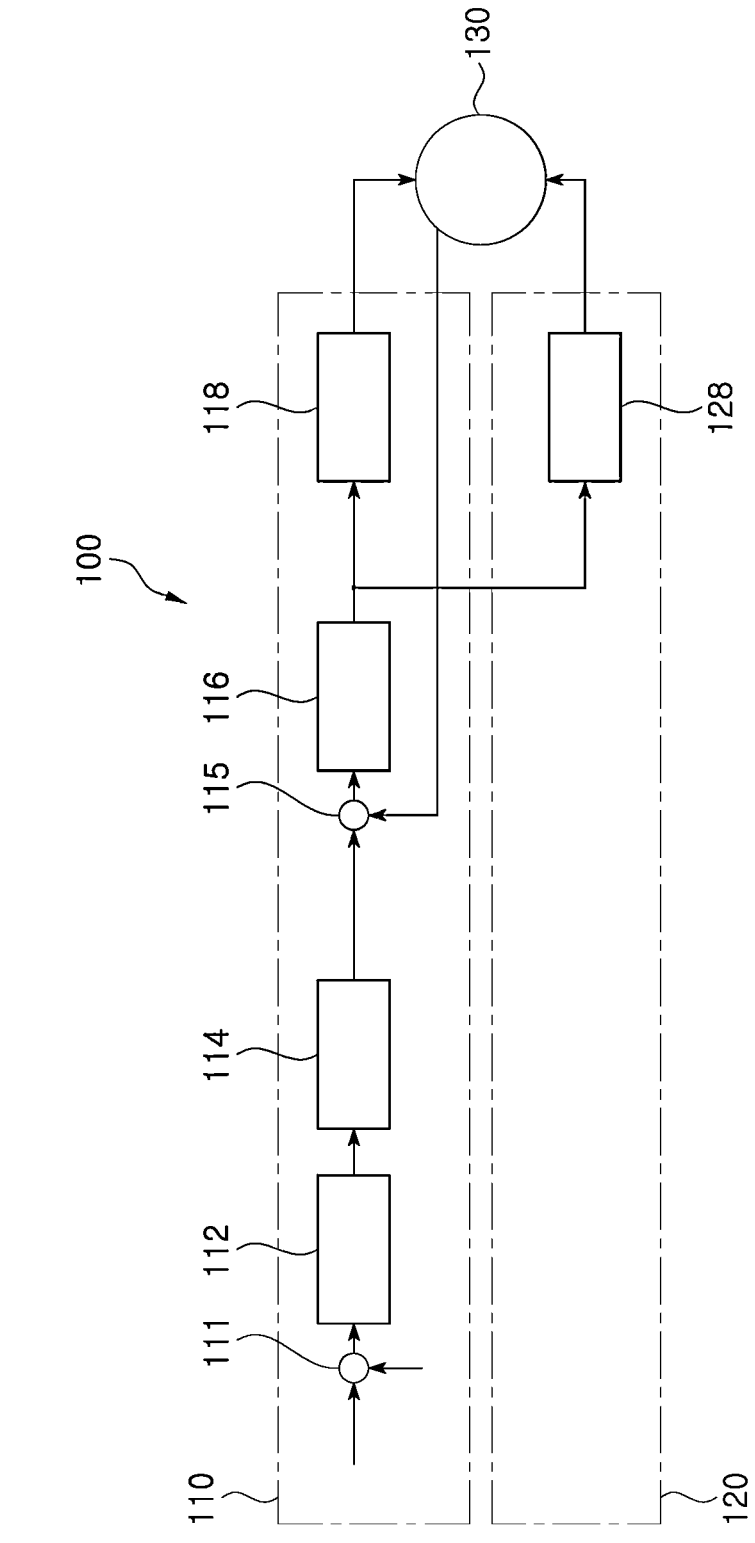
FIG. 3 is a block diagram showing an electromechanical brake system according to a second embodiment of the present disclosure.

Referring to FIG. 3, an electromechanical brake system 100 according to a second embodiment of the present disclosure will be described. The electromechanical brake system 100 according to the second embodiment of the present disclosure includes a first electronic controller 110, a second electronic controller 120, and a motor 130. In describing the second embodiment of the present disclosure, the same description as in the first embodiment will be omitted.

The first electronic controller 110 includes a first merger 111, a pressure controller 112, a speed controller 114, a second merger 115, a first current controller 116, and a first power converter 118, and the second electronic controller 120 includes a third merger 125 and a second power converter 128.

The speed controller 114 of the first electronic controller 110 calculates a current command value for outputting a total torque to control a speed of the motor 130. The speed controller 114 outputs the calculated current command value to the first current controller 116 of the first electronic controller 110.

The first current controller 116 of the first electronic controller 110 calculates a PWM duty using the current command value calculated by the speed controller 114 and a measured current value and outputs the calculated PWM duty.

The first power converter 118 of the first electronic controller 110 receives the PWM duty calculated by the first current controller 116 and outputs the PWM duty after converting power to be applied to the motor 130.

The second power converter 128 of the second electronic controller 120 receives the PWM duty calculated by the first current controller 116 of the first electronic controller 110 and outputs the PWM duty after converting power to be applied to the motor 130.

Figure 4:
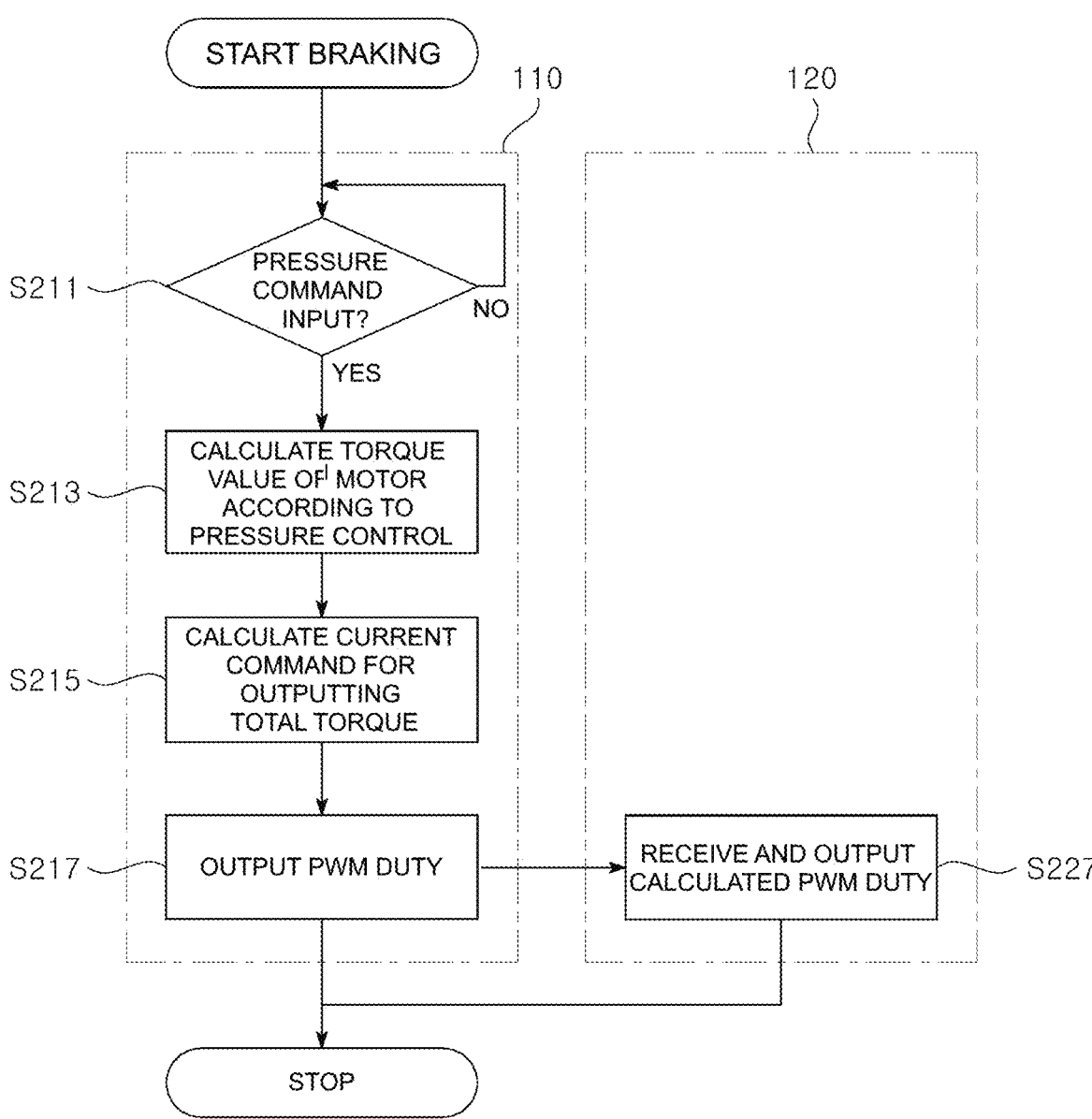
FIG. 4 is a flowchart showing a method of operating the electromechanical brake system according to the second embodiment of the present disclosure.

Referring to FIG. 4, a method of operating the electromechanical brake system 100 according to the second embodiment of the present disclosure will be described. The method of operating the electromechanical brake system 100 according to the second embodiment of the present disclosure will be described with reference to FIG. 3. In describing the second embodiment of the present disclosure, the same description as in the first embodiment will be omitted.

When braking starts in the electromechanical brake system 100, whether a pressure command is input is checked (S211).

Whether the pressure command is input to the pressure controller 112 of the first electronic controller 110 through the first merger 111 is checked, and it is determined that the pressure command is not input to the pressure controller 112, the electromechanical brake system 100 waits until the pressure command is input, and whether the pressure command is input to the pressure controller 112 is continuously checked.

When the pressure command is input, a torque value of the motor 130 according to pressure control is calculated (S213).

The pressure controller 112 of the first electronic controller 110 controls a hydraulic pressure required for operating the brake using the input pressure command and the measured pressure and calculates the torque value of the motor 130. Here, the pressure command is a pressure value for setting and commanding a pressure required for operating the brake, and the measured pressure is a pressure obtained by measuring the hydraulic pressure used for operating the brake.

When the torque value of the motor 130 is calculated, a current command for outputting the total torque is calculated (S215).

In order to control the speed of the motor 130, the current command value for outputting the total torque is calculated by the speed controller 114 of the first electronic controller 110. The speed controller 114 outputs the calculated current command value to the first current controller 116 of the first electronic controller 110.

A PWM duty is output (S217).

A PWM duty is calculated by the first current controller 116 of the first electronic controller 110 using the current command value calculated by the speed controller 114 and the measured current value from the motor 130. The first power converter 118 of the first electronic controller 110 converts power into a PWM duty using the PWM duty calculated by the first current controller 116 and outputs the PWM duty.

The PWM duty is received and output (S227).

The second power converter 128 of the second electronic controller 120 converts power into a PWM duty using the PWM duty calculated by the first current controller 116 and outputs the PWM duty.

The motor 130 may receive a PWM duty through each of the first power converter 118 and the second power converter 128 and may be driven by the received PWM duty.

As is apparent from the above description, according to one embodiment of the present disclosure, as two electronic controllers are used in an electromechanical brake system, even when a problem occurs in one electronic controller, it is possible to maintain a braking force using the other electronic controller, thereby improving stability.

In addition, it is possible to reduce the maximum performance required for electronic components by reducing a current value generated from the two electronic controllers, thereby reducing the heat generation of the electronic controller, improving durability, and increasing price competitiveness.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/ or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An electromechanical brake system comprising:
a motor configured to operate for braking of a vehicle;
a first electronic controller electrically connected to the motor and configured to control driving of the motor; and
a second electronic controller electrically connected to the motor and configured to control the driving of the motor,
wherein the first electronic controller is configured to calculate a current command value using a pressure command for the braking and output a first pulse width modulation (PWM) duty using the calculated current command value, and
the second electronic controller is configured to output a second PWM duty using the current command value calculated by the first electronic controller when both of the first electronic controller and the second electronic controller are in a normal state.

2. The electromechanical brake system of claim 1, wherein the first electronic controller is configured to output the first PWM duty using a certain percentage of the calculated current command value, and
the second electronic controller is configured to output the second PWM duty using a remaining percentage of the current command value calculated by the first electronic controller.

3. The electromechanical brake system of claim 1, wherein the first electronic controller includes:
a pressure controller configured to calculate a torque value of the motor for braking using the pressure command;
a speed controller configured to calculate a current command value for controlling a speed of the motor; and
a first current controller configured to calculate the first PWM duty using a certain percentage of the current command value calculated by the speed controller.

4. The electromechanical brake system of claim 3, wherein the second electronic controller includes a second current controller configured to calculate the second PWM duty using the remaining percentage of the current command value calculated by the speed controller.

5. The electromechanical brake system of claim 3, wherein the first electronic controller is configured to receive the first PWM duty calculated by the first current controller and output the first PWM duty after converting power to be applied to the motor.

6. The electromechanical brake system of claim 4, wherein the first current controller is configured to calculate the first PWM duty using half of the calculated current command value, and
the second current controller is configured to calculate the second PWM duty using half of the calculated current command value.

7. The electromechanical brake system of claim 4, wherein the first current controller is configured to calculate the first PWM duty using a first current command value and the second current controller is configured to calculate the second PWM duty using the first current command value.

8. The electromechanical brake system of claim 1, wherein the first electronic controller is configured to output the first PWM duty using the calculated current command value, and
the second electronic controller is configured to receive and output the first PWM duty calculated by the first electronic controller.

9. The electromechanical brake system of claim 1, wherein the first electronic controller includes:
a pressure controller configured to calculate a torque value of the motor for braking using the pressure command;
a speed controller configured to calculate a current command value for controlling a speed of the motor;
a first current controller configured to calculate the first PWM duty using the current command value calculated by the speed controller; and
a first power converter configured to output the first PWM duty calculated by the first current controller.

10. The electromechanical brake system of claim 9, wherein the second electronic controller includes a second power converter configured to receive and output the first PWM duty calculated by the first current controller.

11. The electromechanical brake system of claim 1, wherein the motor comprises a three-phase permanent magnet synchronous motor.

12. A method of operating an electromechanical brake system, comprising:
inputting a pressure command to a first electronic controller so that a motor operates for braking of a vehicle;
calculating, by the first electronic controller, a torque value of the motor according to the input pressure command;
calculating, by the first electronic controller, a current command value for outputting a total torque of the motor;
outputting, by the first electronic controller, a first PWM duty using the calculated current command value; and
outputting, by a second electronic controller, a second PWM duty using the current command value calculated by the first electronic controller when both of the first electronic controller and the second electronic controller are in a normal state.

13. The method of claim 12, wherein the outputting of the first PWM duty by the first electronic controller comprises outputting the first PWM duty after calculated using a certain percentage of the calculated current command value.

14. The method of claim 13, further comprising calculating, by the second electronic controller, the second PWM duty using a remaining percentage of the calculated current command value,
wherein, the outputting of the second PWM duty by the second electronic controller comprises outputting the second PWM duty calculated by the second electronic controller.

15. The method of claim 14, wherein the first PWM duty is calculated by the first electronic controller using a first current command value and the second PWM duty is calculated by the second electronic controller using the first current command value.

16. The method of claim 14, wherein the first PWM duty is calculated, by the first electronic controller, using half of the calculated current command value, and the second PWM duty is calculated, by the second electronic controller, using half of the calculated current command value.

17. The method of claim 11, further comprises outputting the first PWM duty calculated by the first electronic controller.

18. The method of claim 17, further comprising transmitting the first PWM duty calculated by the first electronic controller to the second electronic controller.

\* \* \* \* \*